United States Patent Office 3,022,283
Patented Feb. 20, 1962

3,022,283
PRODUCTION OF SOLID OLEFIN POLYMERS IN THE PRESENCE OF ACETYLENIC COMPOUNDS USING ALKYL TITANIUM HALIDE CATALYSTS
John E. Wicklatz and Boris Franzus, Bartlesville, Okla., assignors to Phillips Petroleum Company, a corporation of Delaware
No Drawing. Filed June 18, 1959, Ser. No. 821,105
9 Claims. (Cl. 260—93.7)

This invention relates to the production of solid olefin polymers. In one aspect, the invention relates to an improved method for preparing from certain selected olefins solid polymers having a high isotactic content.

The application is a continuation-in-part of our copending U.S. patent application Serial No. 769,558, now abandoned, filed on October 25, 1958.

Various reactions for polymerizing olefins are described in the literature, and the polymerizations are generally carried out in the presence of catalysts. One type of catalyst which has recently been disclosed for use in the polymerization of monoolefins, particularly ethylene, consists of an organometal compound, e.g., triethylaluminum, and a compound of a heavy metal, e.g., titanium tetrachloride. It has been found that when certain olefins, e.g., propylene, are contacted with such a catalyst, a polymer is obtained which contains greater or lesser quantities of a fraction which is crystalline and which is characterized by certain regularity of molecular structure. Thus, a polypropylene molecule can be considered as a chain of 2-carbon units with a methyl side group attached to every other carbon atom in the chain. Certain polymers of this type as characterized by the fact that they contain series of such monomer units in which all the methyl side groups are oriented in space at the same position or at the same angle wtih respect to the respective tertiary carbon atoms to which they are attached. The portion of the polymer having this regular structure is highly crystalline and is generally referred to as isotactic polypropylene. The amount of isotactic polypropylene contained in the total polymer product formed in any given polymerization appears to have a significant influence on certain properties of the polymer product, such as hardness, modulus, ultimate tensile strength, range of melting temperatures, and molding and fiber forming properties. The higher the isotactic content of the polymer the more outstanding are the physical properties of that polymer.

It is an object of this invention, therefore, to provide an improved process for producing isotactic polymers.

Another object of the invention is to provide a process for preparing polymers having isotactic contents which are higher than those of conventionally prepared polymers.

A further object of the invention is to provide a process in which increased yields of isotactic polymers are obtained.

Other and further objects and advantages of the invention will become apparent to those skilled in the art upon consideration of the accompanying disclosure.

The present invention resides in the discovery that certain olefin polymers of very high isotactic content can be prepared if the polymerization is carried out in the presence of very small amounts of certain acetylenic compounds. Broadly speaking, in a process in which an olefin corresponding to the formula R—CH=CH$_2$, wherein R is an alkyl radical containing from 1 to 4 carbon atoms or a phenyl or alkyl substituted phenyl radical, is polymerized in the presence of a catalyst comprising a trialkylaluminum and a halide of titanium, the instant invention resides in the improvement of conducting the polymerization in the presence of an acetylenic compound of the formula R'—C≡C—R', wherein R' is an alkyl, phenyl, biphenyl, alkyl substituted phenyl, or alkyl substituted biphenyl. When proceeding in accordance with the present invention, it has been found that polymers having isotactic contents in the range of 85 to 95 percent and higher can be readily prepared. In contrast, if the polymerization is conducted in the absence of the acetylenic compound with a conventional catalyst, such as titanium trichloride and triisobutylaluminum, the isotactic content of the polymer product is usually less than 80 percent. The reason for the unexpected improvement obtained by employing the acetylenic compounds in the process of this invention is not completely understood. Furthermore, the results obtained are even more surprising when it is noted that only very small amounts of the acetylenic compounds are added during the polymerizations. In general, the addition of the acetylenic compounds to a polymerization system containing catalyst and an olefin, as herein described, makes it possible to obtain a polymer product having a higher isotactic content than that obtainable in the absence of such compounds.

The olefins which are polymerized in accordance with the present process correspond to the formula

$$R—CH=CH_2$$

wherein R is selected from the group consisting of an alkyl radical containing from 1 to 4, inclusive, carbon atoms, a phenyl radical and an alkyl-substituted phenyl radical. The total number of carbon atoms in the alkyl groups substituted on the phenyl ring does not exceed 6 carbon atoms. Examples of suitable olefins include propylene, 1-butene, 1-pentene, 3-methyl-1-butene, 3-methyl-1-pentene, 4-methyl-1-pentene, 3,3-dimethyl-1-butene, styrene, 2-methylstyrene, 4-methyl-styrene, 3-ethylstyrene, 2-ethyl-3-methylstyrene, 3,5-diethylstyrene, 2,4-di-n-propylstyrene, and the like. It is often preferred to employ propylene as the monomer.

The polymerization process of this invention is conducted in the presence of a catalyst comprising trialkylaluminum and a halide of titaninm. The trialkylaluminum can be represented by the general formula R"$_3$Al, wherein R" is an alkyl radical, preferably containing from 1 to 12, inclusive, carbon atoms. Examples of compounds corresponding to the aforementioned formula which can be used include trimethylaluminum, triethylaluminum, triisobutylaluminum, tri-n-butylaluminum, tri-n-pentylaluminum, triisooctylaluminum, tri-n-dodecylaluminum, and the like.

In addition to the trialkylaluminum, the catalyst used in the practice of this invention includes a halide of titanium. While any of the titanium halides can be used, including the chlorides, fluorides, bromides, and iodides, it is preferred to employ the tri- and tetrachlorides of titanium. It has also been found to be particularly desirable to use titanium trichloride as a component of the catalyst system.

Specific examples of catalyst systems which can be advantageously used include the following: triethylaluminum and titanium trichloride; triisobutylaluminum and titanium trichloride; tri-n-dodecylaluminum and titanium trichloride; titanium tribromide and tri-n-butylaluminum; titanium tribromide and triisooctylaluminum; titanium triiodide and tri-n-pentylaluminum; titanium triiodide and tri-n-hexylaluminum; titanium tetrachloride and triisobutylaluminum; titanium tetrabromide and tri-n-heptylaluminum; and titanium tetraiodide and triethylaluminum.

The acetylenic compounds, in the presence of which the polymerization is conducted, correspond to the formula R'—C≡C—R', in which R' is selected from the group consisting of alkyl, phenyl, biphenyl, and alkyl-substituted phenyl and alkyl substituted biphenyl radicals, each of the hydrocarbon radicals containing from 1 to 16 carbon atoms. It is to be understood from the foregoing that the R"'s in the formula can be alike or different. Examples of acetylenic compounds which can be employed include diphenylacetylene, dimethylacetylene, diethylacetylene, n-propylacetylene, methylethylacetylene, n-butylacetylene, methyl-n-propylacetylene, n-hexylacetylene, methyl-n-amylacetylene, ethyl-n-butylacetylene, n-octylacetylene, di-n-butylacetylene, methyl-n-hexadecylacetylene, n-hexadecylacetylene, tert-dodecylacetylene, ethyl(4-methylphenyl)acetylene, isopropyl(3-methyl-2-biphenyl)acetylene, dipropylacetylene, di(4-methylphenyl)acetylene, di-tert-butylacetylene, dioctylacetylene, di(3-octylphenyl)acetylene, didodecylacetylene, dihexadecylacetylene, di(2-biphenyl)acetylene, di(4-biphenyl)acetylene, di(3-methyl-2-biphenyl)acetylene, di(4-tert-decylphenyl)acetylene, and the like.

The ratios of the catlyst components employed in the present process can be varied rather widely, depending upon the particular monomer used and the operating conditions. The mol ratio of the trialkylaluminum to the titanium halide is usually in the range of 1:1 to 10:1 with a preferred range being 2:1 to 5:1. The concentration of catalyst in the polymerization zone is usually in the range of 0.01 to 5.0 weight percent, based on the monomer charged to that zone, although larger amounts can be used.

It has been discovered that only very small amounts of the acetylenic compounds are required in order to obtain the improvement according to the present invention. The amount of the acetylenic compound employed is generally in the range from 0.01 to 0.5 mol, preferably from 0.01 to 0.3 mol, per mol of the total catalyst composition. The amount of the acetylenic compound utilized is also limited by the amount of the monomer charged to the polymerization zone. Thus, from 0.001 to 0.10, preferably from 0.005 to 0.06, weight percent of the acetylenic compound is employed in the polymerization, the aforementioned values being based upon the amount of monomer charged to the polymerization zone. In order to obtain maximum yields of isotactic polymer, it is important that the amounts of the acetylenic compounds added do not exceed the specified ranges.

The process of this invention is usually carried out in the presence of a hydrocarbon diluent which is relatively inert and liquid under the conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend upon the particular conditions and techniques used and are generally governed by the capacity of the apparatus to effect suitable agitation and heat removal. In general, the total olefin content of the feed mixture charged to the polymerization reactor is in the range of 0.5 to 25 weight percent, of the diluent present in the reactor.

The polymerization can be carried out at a temperature varying over a rather broad range, for example, from zero to 500° F. However it is usually preferred to conduct the reaction at a temperature in the range of 100 to 350° F., and more desirably between 200 and 300° F. The pressure employed in the process can vary from atmospheric and below to about 400 to 500 p.s.i.g. or higher. In general, pressures are satisfactory which are sufficient to maintain the reaction mixture substantially in the liquid phase.

It has been found that various materials in some instances may have a tendency to inactivate the catalyst composition of this invention. These materials include oxygen and water. Therefore, it is usually desirable to free the olefins to be polymerized from these materials, as well as from other materials which may tend to inactivate the catalyst before contacting the olefin with the catalyst. Any of the known means for removing such contaminants can be employed. Furthermore, the hydrocarbon diluent employed in the process should also be freed of contaminants, such as water, oxygen, and the like. It is desirable also that air and moisture be removed from the reaction vessel before the reaction is carried out. This is usually accomplished by purging with an inert gas as described more in detail hereinafter. In some cases, small amounts of catalysts inactivating materials, such as oxygen and water, can be tolerated in the reaction mixture while still obtaining reasonably good polymerization rates. It is to be understood, however, that the amount of such materials present in the reaction mixture shall not be sufficient to completely inactivate the catalyst.

The process of this invention can be carried out as a batch process by pressuring the olefin to be polymerized into a reactor containing the catalyst, the acetylenic compound, and the diluent. When employing a catalyst comprising a trialkylaluminum and titanium trichloride, it is preferred to add a portion of the diluent initially after which this material is purged with an inert gas such as nitrogen. The catalyst components are then charged separately to the reactor with intermediate purging and with the trialkylaluminum being added in at least a portion of the remainder of the diluent. Any diluent remaining can then be introduced into the reactor after which the monomer is added to the reactor. Thereafter, the reactor is heated until polymerization is initiated. If the acetylenic compound is sufficiently high boiling so that it will not be removed during purging operations, it can be added to the reactor with the initial diluent. It can also be charged after addition of the catalyst components or at any other suitable time, preferably prior to the addition of the monomer. If low boiling acetylenic compounds, such as acetylene and dimethylacetylene, are employed, such compounds should be added subsequent to all purging operations and preferably prior to the addition of the monomer. If desired, the acetylenic compound can be added immediately prior to the addition of the monomer, and in some instances it may be added with the initial monomer charge. While it is preferred to operate in accordance with the aforementioned charging procedure, it is to be understood that it is not intended to limit the invention to any particular method for adding the reactant materials to the reactor. Furthermore, the process can be carried out continuously by maintaining the above-described concentration of reactants in the reactor for a suitable residence time. The residence time used in a continuous process can vary widely since it depends to a great extent upon the temperature at which the process is carried out and upon the specific olefin that is to be polymerized. However, the residence time in a continuous process generally falls within the range of one second to an hour or more. In a batch process, the time for the reaction can also vary widely, such as from 15 minutes up to 24 hours or more.

Upon the completion of the polymerization reaction, any excess olefin is vented and the contents of the reactor are then treated by any suitable method to inactivate the catalyst and remove the catalyst residues. In one method, inactivation of the catalyst is accomplished by washing with an alcohol, water or other suitable materials. In some cases, the catalyst inactivating treatment also removes a major proportion of the catalyst residues while in other cases it may be necessary to treat the polymer with an acid, a base or other suitable material to effect the desired removal of the catalyst residues. The treatment of the polymer may be carried out in a comminution zone, such as a Waring Blendor, so that a finely divided polymer is thereby provided. The polymer is then separated from the diluent, e.g., by decantation, filtration, or other suitable method, after which the polymer is dried.

The diluent and treating agents can be separated by any suitable means, e.g., by fractional distillation, and reused in the process.

A more complete understanding of the invention can be obtained by referring to the following illustrative examples which are not intended, however, to be unduly limitative of the invention.

EXAMPLE I

A series of runs was carried out according to this invention in which propylene was polymerized with a catalyst consisting of triethylaluminum and titanium trichloride in the presence of an acetylenic compound.

In run 1 shown in the table hereinafter, 1000 ml. of cyclohexane was charged to a stainless steel reactor. After purging this material with nitrogen, 0.674 gram of titanium trichloride was added to the reactor. The reactor was then closed and flushed twice with nitrogen. There was then added to the charging tube of the reactor 1.49 grams of triethylaluminum in 300 ml. of cyclohexane. The reactor stirrer was started and allowed to run for one minute. Thereafter, 0.1 gram of diphenylacetylene dissolved in 300 ml. cyclohexane was introduced into the reactor through the charging tube, and the tube was rinsed by adding an additional 400 ml. of cyclohexane. The reactor was then flushed twice at 100 p.s.i.g. with propylene, and the reactor stirrer was started, after which 0.6 pound (272 grams) of propylene was charged. The reactor was heated until polymerization was initiated, and the temperature was maintained in the range specified in Table I hereinafter. Additional propylene was bled into the reactor during the latter part of the run. At the end of the reaction period, the propylene feed was shut off, the stirrer was stopped, and the reactor was cooled. A total of 1.17 pounds (530 grams) of propylene was charged to the reactor during the run.

Runs 2 to 5 shown in the table were conducted in a manner similar to run 1 except that the acetylenic compound was added to the reactor in the initial diluent charge (1000 ml. of cyclohexane) and the organoaluminum compound was charged in 500 ml. of diluent through the reactor charging tube. Five hundred ml. of cyclohexane was then added as a rinse through the charging tube.

In runs 6 and 7, in which dimethylacetylene and acetylene were used, the charging procedure of run 1 was varied by introducing the acetylenic compounds into the charge line from a bomb after the propylene purge of the reactor had been accomplished. The materials then entered the reactor ahead of the propylene monomer charge.

Upon the completion of each run, the reactor was opened, and the contents thereof were discharged into about an equal volume of isopropyl alcohol. This mixture was then transferred to a Waring Blendor where it was comminuted at high speed for about 1 minute. The polymer, which then filtered from the mixture, was dried in a vacuum oven at 80° C.

The isotactic content of each of the polymer products was determined by placing 2.5±0.1 grams of polymer in a weighed extraction thimble and extracting with 100 ml. of n-heptane for 2.5 hours in an ASTM Rubber Extraction apparatus. The thimble was then removed and dried in a forced air oven at 110° C. for two hours after which it was cooled in a desiccator and weighed. Two tests were run on each polymer product. The weight percent of residue based on the original polymer was calculated for each test and averaged and then recorded as the isotactic content of that particular polymer.

The conditions under which the various runs were conducted and the results of these runs are shown hereinbelow in Table I.

Table I

| Run No. | 1 | 2 | 3 | 4 | 5 | 6 | 8[1] |
|---|---|---|---|---|---|---|---|
| TiCl₃: | | | | | | | |
| Grams | 0.674 | 0.684 | 0.665 | 0.585 | 0.630 | 0.634 | 0.643 |
| Millimoles | 4.35 | 4.43 | 4.32 | 3.80 | 4.08 | 4.12 | 4.17 |
| TEA: | | | | | | | |
| Grams | 1.49 | 1.51 | 1.47 | 1.28 | 1.39 | 1.40 | 1.43 |
| Millimoles | 13.0 | 13.2 | 12.9 | 11.2 | 12.2 | 12.29 | 12.52 |
| Acetylenic compound | ([2]) | ([2]) | ([2]) | ([2]) | ([3]) | ([4]) | None |
| Gms. | 0.1 | 0.2 | 0.3 | 0.340 | 0.085 | 0.055 | |
| Millimoles | 0.56 | 1.12 | 1.68 | 1.91 | 1.03 | 1.02 | |
| Mol ratio, TEA/TiCl₃ | 3.0 | 2.98 | 2.98 | 2.98 | 3.0 | 2.99 | 3.0 |
| Moles acetylenic compound per mol catalyst | .0323 | .0675 | .0975 | .1270 | .0635 | 0.069 | |
| Temperature, °F.: | | | | | | | |
| Low | 200 | 200 | 200 | 200 | 200 | 200 | 200 |
| High | 260 | 255 | 260 | 275 | 240 | 300 | 260 |
| Time, hours [5] | 2.67 | 2.67 | 2.5 | 2.5 | 2.5 | 1.75 | 2.5 |
| Propylene, grams | 530 | 500 | 635 | 527 | 658 | 353 | 476 |
| Yield, grams | 419 | 397 | 468 | 438 | 475 | 229 | 406 |
| Productivity, gm./gm. cat. | 193 | 181 | 219 | 235 | 235 | 116 | 196 |
| Isotactic content, percent | 86 | 87 | 92 | 89 | 85 | 86 | 82 |

[1] Control run.
[2] Diphenylacetylene.
[3] Diethylacetylene.
[4] Dimethylacetylene.
[5] Time measurement started when temperature reached 200° F.

Tests were made to determine certain physical properties of the polymers obtained in runs 1, 2, 3, 4, 5 and 8. The results of these tests are set forth hereinbelow in Table II.

Table II

| Run No. | 1 | 2 | 3 | 4 | 5 | 8 |
|---|---|---|---|---|---|---|
| Inherent viscosity [1] | Insol. | 4.23 | Insol. | Not det. | Not det. | Insol. |
| Melt index [2] | 0.6-0.4 | .37 | 2.31 | 2.34 | 5.65 | .65 |
| Density, g./cc. at 23° C.[3] | 0.9054 | 0.9058 | 0.9055 | 0.9136 | 0.9046 | 0.9032 |
| Strength, IZOD, ft. lbs./in notch [4] | 1.06 | 1.1 | 2.4 | 1.4 | 1.8 | 1.2 |
| Stiffness, p.s.i.[5] | 145,000 | 152,000 | 168,000 | 174,000 | 135,000 | 124,000 |
| Tensile at yield, p.s.i.[6] | 5,126 | 5,208 | 5,058 | 4,826 | 4,376 | 4,070 |
| Tensile at break, p.s.i.[6] | 5,126 | 5,208 | 3,198 | 3,053 | 2,744 | 4,070 |
| Elongation at break, percent [6] | 18 | 20 | 40 | 38 | 55 | 29 |
| Zero strength temperature, °F.[7] | 330 | 305 | 336 | 300 | 324 | 286 |

[1] Determined by method of Kemp et al., Ind. & Eng. Chem. 35, 1108 (1943).
[2] Determined by method of ASTM D-1238-52T. Modified by taking 5 samples at 2 minute intervals, averaging the 5 values (weights), discarding any values which deviate from the average by more than 5 percent by weight, reaveraging and multiplying by 5 to obtain the amount of polymer extruded in 10 minutes. The melt index is defined as the grams of polymer extruded in 10 minutes through an 0.0825 inch orifice at 190° C. when subjected to a load of 2,160 grams. In runs 3, 4, and 5, 10 times the normal load was used, the value given representing a high load melt index.
[3] The density values were obtained by the use of a density gradient column which was prepared according to the method of Tung and Taylor, J. Polymer Science, 17, 441 (1955), ibid 19, 598 (1956), and ibid 21, 144 (1956). In preparing polypropylene samples for the tests, polymer from each run was molded into a slab in a mold heated at 420° F. When the polymer was molten, the mold was cooled to about room temperature at the rate of about 150° F. per minute. Thereafter, the slab was removed from the mold, and a piece of the slab about the size of a pea was used in the density determination test. In this test, a tube having a length slightly over one meter and an inside diameter of 4 cm. is graduated into one-millimeter divisions. The tube is filled with a water-ethanol mixture, introduced in a manner such that the ratio of ethanol to water increases progressively from the bottom to the top. The density of the liquid contents is thus diminished uniformly up the tube. Hollow glass beads of known densities within the range of the density gradient in the tube are introduced into the column and these beads settle to a point where their density is in equilibrium with that of the liquid. The positions of the beads are plotted against density on a graph. A sample of polypropylene, prepared as just described, is dropped in the column and after about 15 minutes, the sample comes to rest at a point where its weight is exactly equal to the weight of the displaced liquid. The position is noted and referred to the graph, from which the density can be determined with an accuracy within the limits of ±0.0002 gm./cc. Since the tubes are operated at ambient temperature, it is necessary to plot the positions of the beads for each set of determinations.
[4] Determined by method of ASTM D-256-54T (¼" bar).
[5] Determined by method of ASTM D-747-50.
[6] Determined by method of ASTM D-412-51T.
[7] Essentially by method of Islyn Thomas, "Injection Molding of Plastics," Rheinhold Pub. Corp., page 504 (1947).

Example II

Another series of runs was carried out in which propylene was polymerized with a catalyst consisting of triethylaluminum and titanium trichloride in the presence of an acetylenic compound.

In this series of runs, the procedure of run 1 of Example I was followed except as noted hereinafter. In runs 11 to 22, the acetylenic compound was added to the reactor in the initial diluent charge (1000 ml. of cyclohexane) and the organoaluminum compound was charged in 500 ml. of diluent through the reactor charging tube. Five hundred milliliters of cyclohexane was then added as a rinse through the charging tube. Run 10 was conducted in the same manner as runs 6 and 7 of Example I. The control runs of Examples I and II, i.e., runs 8 and 9, were carried out in the manner of runs 2 to 5 of Example I and runs 11 to 22 of Example II except that the acetylenic compound was not included in the initial diluent charge. Each of the polymer products was recovered and its isotactic content determined as described in Example I.

The conditions under which the runs were conducted and the results of the runs are set forth below in Table III.

It is apparent from an examination of the data included in Table III that the process of this invention results in the production of propylene polymers having isotactic contents in excess of 85 percent, e.g., up to 97 percent. It will be noted that in the control run in which an acetylenic compound was not used, the polypropylene product had an isotactic content of 79.5 percent.

The polymers produced in accordance with the invention have utility in applications where solid plastics are used. They can be molded to form articles of any desired shape such as bottles or other containers for liquids. Furthermore, they can be formed into sheets, film or pipe by extrusion or other suitable methods.

It will be apparent to those skilled in the art that many variations and modifications of the invention can be made upon study of the foregoing disclosure. Such variations and modifications are believed to come within the spirit and scope of the invention.

We claim:

1. In a process for polymerizing an olefin in the presence of a catalyst comprising a trialkylaluminum and a trihalide of titanium, the improvement which comprises contacting said catalyst with an olefin corresponding to the formula $R\!-\!CH\!=\!CH_2$, wherein R is an alkyl radical containing from 1 to 4, inclusive, carbon atoms, said contacting occurring in the presence of an acetylenic compound corresponding to the formula $R'\!-\!C\!\equiv\!C\!-\!R'$, wherein R' is selected from the group consisting of an alkyl radical and a phenyl radical, each said radicals containing from 1 to 16, inclusive, carbon atoms, the amount of said acetylenic compound being in the range of 0.01 to 0.5 mol per mol of said catalyst.

2. A process in accordance with claim 1 wherein said acetylenic compound is diphenylacetylene.

*Table III*

| Run No. | 9[1] | 10 | 11 | 12 | 13 | 14 | 15 |
|---|---|---|---|---|---|---|---|
| TiCl$_3$: | | | | | | | |
| Grams | 0.664 | 0.607 | 0.609 | 0.579 | 0.614 | 0.676 | 0.626. |
| Millimoles | 4.30 | 3.92 | 3.96 | 3.76 | 3.99 | 4.39 | 4.06. |
| TEA: | | | | | | | |
| Grams | 1.44 | 1.34 | 1.34 | 1.27 | 1.35 | 1.49 | 1.37. |
| Millimoles | 12.6 | 11.7 | 11.7 | 11.1 | 11.8 | 13.0 | 12.0. |
| Acetylenic compound | Control | Dimethyl[2] | Diethyl[3] | Diethyl[3] | 2-octyne[4] | 3-octyne[5] | 4-octyne.[6] |
| Gms | | 0.107 | 0.164 | 0.308 | 0.220 | 0.241 | 0.223. |
| Millimoles | | 1.98 | 2.00 | 3.76 | 2.00 | 2.19 | 2.03. |
| Mol ratio, TEA/TiCl$_3$ | 2.94 | 2.99 | 2.96 | 2.96 | 2.96 | 2.98 | 2.98. |
| Moles acetylenic compound per mol catalyst | | 0.127 | 0.128 | 0.253 | 0.127 | 0.126 | 0.126. |
| Temperature, °F.: | | | | | | | |
| Low | 200 | 200 | 200 | 200 | 200 | 200 | 200. |
| High | 260 | 249 | 255 | 259 | 240 | 255 | 255. |
| Time, hours[7] | 2.5 | 2.5 | 2.5 | 2.5 | 2.5 | 2.5 | 2.5. |
| Propylene, lbs | 1.130 | 1.265 | 1.000 | 1.200 | 1.100 | 1.120 | 1.000. |
| Yield, grams | 388 | 132 | 274 | 219 | 156 | 237 | 238. |
| Productivity, gm./gm. cat | 184 | 68 | 140 | 117 | 79 | 109 | 119. |
| Isotactic content, percent | 79.5 | 97 | 89 | 90 | 92 | 91 | 87. |

| Run No. | 16 | 17 | 18 | 19 | 20 | 21 | 22 |
|---|---|---|---|---|---|---|---|
| TiCl$_3$: | | | | | | | |
| Grams | 0.626 | 0.686 | 0.677 | 0.667 | 0.592 | 0.584 | 0.673. |
| Millimoles | 4.06 | 4.45 | 4.40 | 4.33 | 3.85 | 3.79 | 4.37. |
| TEA: | | | | | | | |
| Grams | 1.37 | 1.52 | 1.50 | 1.47 | 1.31 | 1.28 | 1.49. |
| Millimoles | 12.0 | 13.3 | 13.2 | 12.9 | 11.5 | 11.2 | 13.1. |
| Acetylenic compound | 5-decyne[8] | 5-decyne[8] | 2-hexyne[9] | 1-pentyne[10] | 2-pentyne[11] | 2-pentyne[11] | Phenyl.[12] |
| Gms | 0.280 | 0.614 | 0.180 | 0.110 | 0.098 | 0.129 | 0.167. |
| Millimoles | 2.03 | 4.45 | 2.14 | 1.62 | 1.44 | 1.90 | 1.64. |
| Mol ratio, TEA/TiCl$_3$ | 2.96 | 3.00 | 3.00 | 2.98 | 2.99 | 2.96 | 3.00. |
| Moles acetylenic compound per mol catalyst | 0.126 | 0.250 | 0.123 | 0.094 | 0.094 | 0.127 | 0.094. |
| Temperature, °F.: | | | | | | | |
| Low | 200 | 200 | 200 | 200 | 200 | 200 | 200. |
| High | 265 | 250 | 249 | 247 | 249 | 242 | 247. |
| Time, hours[7] | 2.5 | 2.5 | 2.5 | 2.5 | 2.5 | 2.5 | 2.5. |
| Propylene, lbs | 1.120 | 1.1000 | 1.195 | 0.950 | 0.990 | 0.600 | 0.910. |
| Yield, grams | 362 | 248 | 212 | 242 | 110 | 19 | 177. |
| Productivity, gm./gm. cat | 182 | 113 | 98 | 113 | 58 | 10 | 82. |
| Isotactic content, percent | 90.5 | 95 | 86 | 85.5 | 90.4 | 93.0 | 87.3. |

[1] Control run.
[2] Dimethylacetylene.
[3] Diethylacetylene.
[4] Methyl-n-amylacetylene.
[5] Ethyl-n-butylacetylene.
[6] Di-n-propylacetylene.
[7] Time measurement started when temperature reached 200° F.
[8] Di-n-butylacetylene.
[9] Methynl-propylacetylene.
[10] n-Propylacetylene.
[11] Methylethylacetylene.
[12] Phenylacetylene.

From a consideration of the data in Table I, it is seen that in accordance with the instant invention propylene polymers having isotactic contents of 85 percent and higher were produced. When carrying out the polymerization with a similar catalyst but in the absence of the acetylenic compounds of this invention, the polymer product had a considerably lower isotactic content. It is also seen from the data in Table II that the polymers of runs 1, 2, 3, 4 and 5, prepared according to the present invention, possess proprieties which are superior to the polymer obtained in the control run.

3. A process in accordance with claim 1 wherein said acetylenic compound is diethylacetylene.

4. A process in accordance with claim 1 wherein said acetylenic compound is di-n-butylacetylene.

5. In a process for polymerizing an olefin in the presence of a catalyst comprising a trialkylaluminum and a trihalide of titanium, the improvement which comprises contacting said catalyst with an olefin corresponding to the formula R—CH=CH$_2$, wherein R is an alkyl radical containing from 1 to 4, inclusive, carbon atoms, said contacting occurring in the presence of an acetylenic compound corresponding to the formula R'—C≡C—R', wherein R' is selected from the group consisting of an alkyl radical and a phenyl radical, each said radicals containing from 1 to 16, inclusive, carbon atoms, and in the presence of a hydrocarbon diluent at a temperature in the range of zero to 500° F. and at a pressure sufficient to maintain said diluent in the liquid phase, the amount of said acetylenic compound being in the range of 0.01 to 0.5 mol per mol of said catalyst and in the range of 0.001 to 0.10 weight percent of said olefin.

6. The process according to claim 5 in which the amount of said acetylenic compound is in the range of 0.01 to 0.3 mol per mol of said catalyst and in the range of 0.005 to 0.06 weight percent of said olefin.

7. The process according to claim 5 in which said catalyst consists essentially of triethylaluminum and titanium trichloride.

8. The process according to claim 5 in which said catalyst consists essentially of triisobutylaluminum and titanium trichloride.

9. In a process for polymerizing propylene in the presence of a catalyst comprising triethylaluminum and titanium trichloride, the improvement which comprises contacting said catalyst with propylene in the presence of dimethylacetylene, the amount of said dimethylacetylene being in the range of 0.01 to 0.5 mol per mol of said catalyst.

References Cited in the file of this patent

UNITED STATES PATENTS 2,898,327      McCullogh et al. _____ Aug. 4, 1959

FOREIGN PATENTS 536,899      Italy _____ Dec. 12, 1955